United States Patent
Santos et al.

(10) Patent No.: US 9,075,434 B2
(45) Date of Patent: Jul. 7, 2015

(54) TRANSLATING USER MOTION INTO MULTIPLE OBJECT RESPONSES

(75) Inventors: Oscar Omar Garza Santos, Seattle, WA (US); Matthew Haigh, Seattle, WA (US); Christopher Vuchetich, Seattle, WA (US); Ben Hindle, Bellevue, WA (US); Darren A. Bennett, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 417 days.

(21) Appl. No.: 12/859,995

(22) Filed: Aug. 20, 2010

(65) Prior Publication Data

US 2012/0047468 A1 Feb. 23, 2012

(51) Int. Cl.
G06F 3/033 (2013.01)
G06F 3/01 (2006.01)
G06F 3/03 (2006.01)

(52) U.S. Cl.
CPC .............. G06F 3/011 (2013.01); G06F 3/0304 (2013.01); G06F 3/017 (2013.01)
USPC .............................. 715/863; 715/862; 463/36

(58) Field of Classification Search
CPC ....... G06F 3/0346; G06F 17/00; G06F 3/016; G06F 3/014; G06F 3/033; G06F 3/0383; G06F 3/0482; G06F 3/04845; G06F 3/017; G06F 3/011; G06F 3/0425; G06F 3/0304; A63F 13/02; A63F 2300/6045; A63F 13/06; A63F 2300/1087; A63F 2300/8082; A63F 2300/5553
See application file for complete search history.

(56) References Cited

U.S. PATENT DOCUMENTS

| | | | |
|---|---|---|---|
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |

(Continued)

FOREIGN PATENT DOCUMENTS

| | | |
|---|---|---|
| CN | 101254344 B | 6/2010 |
| EP | 0583061 A2 | 2/1994 |

(Continued)

OTHER PUBLICATIONS

EyeCon—a Motion Sensing Tool for creating interactive dance, music and video projections. Robert Wechsler, Frieder Weib and Peter Dowling Mar. 29, 2004.*

(Continued)

*Primary Examiner* — Boris Pesin
*Assistant Examiner* — Ayesha Huertas Torres
(74) *Attorney, Agent, or Firm* — Miia Sula; Judy Yee; Micky Minhas

(57) ABSTRACT

A system for translating user motion into multiple object responses of an on-screen object based on user interaction of an application executing on a computing device is provided. User motion data is received from a capture device from one or more users. The user motion data corresponds to user interaction with an on-screen object presented in the application. The on-screen object corresponds to an object other than an on-screen representation of a user that is displayed by the computing device. The user motion data is automatically translated into multiple object responses of the on-screen object. The multiple object responses of the on-screen object are simultaneously displayed to the users.

16 Claims, 14 Drawing Sheets

(56) References Cited

U.S. PATENT DOCUMENTS

| | | |
|---|---|---|
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,512,838 B1 | 1/2003 | Rafii et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,071,914 B1 * | 7/2006 | Marks .................... 463/36 |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |

(56) References Cited

U.S. PATENT DOCUMENTS

| | | | |
|---|---|---|---|
| 7,684,592 | B2 | 3/2010 | Paul et al. |
| 7,701,439 | B2 | 4/2010 | Hillis et al. |
| 7,702,130 | B2 | 4/2010 | Im et al. |
| 7,704,135 | B2 | 4/2010 | Harrison, Jr. |
| 7,710,391 | B2 | 5/2010 | Bell et al. |
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2005/0231512 | A1 | 10/2005 | Niles et al. |
| 2008/0026838 | A1 | 1/2008 | Dunstan et al. |
| 2008/0152191 | A1 | 6/2008 | Fujimura et al. |
| 2008/0195735 | A1 | 8/2008 | Hodges et al. |
| 2009/0077504 | A1 | 3/2009 | Bell et al. |
| 2009/0141933 | A1 | 6/2009 | Wagg |
| 2009/0221368 | A1 | 9/2009 | Yen et al. |
| 2010/0241998 | A1* | 9/2010 | Latta et al. ............ 715/862 |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | W02009059065 | 5/2009 |
| WO | WO 2009059065 A1 * | 5/2009 |

OTHER PUBLICATIONS

Qian, et al., "A Gesture-Driven Multimodal Interactive Dance System," 2004 IEEE International Conference on Multimedia and Expo (ICME), 2004, pp. 1579-1582.

Shivappa, et al., "Person Tracking With Audio-visual Cues Using the Iterative Decoding Framework," IEEE 5th International Conference on Advanced Video and Signal Based Surveillance, 2008, pp. 260-267.

Toyama, et al., "Probabilistic Tracking in a Metric Space," Eighth International Conference on Computer Vision, Vancouver, Canada, vol. 2, Jul. 2001, 8 pages.

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, pp. 90-102, University of Texas at Austin, Austin, TX.

Shao et al., "An Open System Architecture for a Multimedia and Multimodal User Interface", Aug. 24, 1998, 8 pages, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, 35 pages, Germany.

Hasegawa et al., "Human-Scale Haptic Interaction with a Reactive Virtual Human in a Real-Time Physics Simulator", Jul. 2006, 12 pages, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, 121 pages, The Robotics Institute, Carnegie Mellon University, Pittsburgh, PA.

He, "Generation of Human Body Models", Apr. 2005, 111 pages, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, 145 pages, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, pp. 602-605, vol. 15, No. 6, IEEE Transactions on Pattern Analysis and Machine Intelligence.

Granieri et al., "Simulating Humans in VR", The British Computer Society, Oct. 1994, pp. 1-4, 6-9, 12, 15-16, and 18-21 (15 pages) Academic Press.

Brogan et al., "Dynamically Simulated Characters in Virtual Environments", Sep./Oct. 1998, pp. 58-69, vol. 18, Issue 5, IEEE Computer Graphics and Applications.

Fisher et al., "Virtual Environment Display System", ACM Workshop on Interactive 3D Graphics, Oct. 1986, 12 pages, Chapel Hill, NC.

"Virtual High Anxiety", Tech Update, Aug. 1995, pp. 22.

Sheridan et al., "Virtual Reality Check", Technology Review, Oct. 1993, pp. 21-28, vol. 96, No. 7.

Stevens, "Flights into Virtual Reality Treating Real-World Disorders", The Washington Post, Mar. 27, 1995, Science Psychology, 2 pages.

"Simulation and Training", 1994, 6 pages, HP Division Incorporated.

English Machine-translation of Japanese Publication No. JP08-044490 published on Feb. 16, 1996.

Wechsler, et al., "EyeCon—a motion sensing tool for creating interactive dance, music and video projections," Proceedings of the Society for the Study of Artificial Intelligence and the Simulation of Behavior (SSAISB) Convention, Mar. 29, 2004, 7 pages.

Ashbrook, et al., "MAGIC: A Motion Gesture Design Tool," CHI 2010, Apr. 10, 2010, 10 pages.

Animation, [http://www.bookrags.com/research/animation-csci-01/], Retrieved on May 3, 2010, 8 pages.

ScreenFX Interactive Displays on LCD and Plasma Screens and Interactive Windows, [http://www.gesturetek.com/gesturefx/productsolutions_screenfx.php], Retrieved on May 3, 2010, 2 pages.

Turk, Matthew, "Chapter 10. Gesture Recognition," [http://ilab.cs.ucsb.edu/projects.turk/TurkVEChapter.pdf], Retrieved on May 3, 2010, 25 pages.

* cited by examiner

TRANSLATING USER MOTION INTO MULTIPLE OBJECT RESPONSES

BACKGROUND

In the past, computing applications such as computer games and multimedia applications used controllers, remotes, keyboards, mice, or the like to allow users to manipulate game characters. More recently, computer games and multimedia applications have begun employing cameras and software gesture recognition to provide a human computer interface ("HCI"). With HCI, user interaction in the form of user gestures are detected, interpreted and used to control game characters.

SUMMARY

Technology is disclosed that enhances user interaction with an application by allowing a user to interact with various on-screen objects that have traditionally been non-interactive and static. For example, user motion can be used to change, control or move objects in addition to an on-screen representation of a user. User motion relating to user intent to interact with the application is captured and the user motion is translated into multiple object responses of the on-screen objects. The multiple object responses of the on-screen objects provides an enhanced and improved user experience for a user interacting with the application, without altering an outcome of a typical or otherwise passive interaction of the application, by the user.

In one embodiment, a method for translating user motion into multiple object responses of an on-screen object based on user interaction of an application executing on a computing device is provided. User motion data is received from a capture device from one or more users. The user motion data corresponds to user interaction with an on-screen object presented in the application. The on-screen object corresponds to an object other than an on-screen representation of a user that is displayed by the computing device. The user motion data is automatically translated into multiple object responses of the on-screen object. The multiple object responses of the on-screen object are simultaneously displayed to the users.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

Technology is disclosed by which user interaction with an application executing on a computing device is enhanced so that the user can interact with an on-screen object that is not the on-screen representation of the user. A capture device captures user motion data relating to user intent to interact with an application. A computing device is connected to the capture device and receives information about the user motion data from the capture device to control various aspects of the application. The application may include, for example, a video game application or a movie application executing in the computing device. One or more users interact with the on-screen object depicted by the application, via a user interface in the computing device. In one embodiment, the on-screen object corresponds to, for example, non-traditional gameplay elements such as animate objects or in-animate objects displayed during non-interactive or static experiences, such as, for example, static movie sequences, story sequences, cinematic sequences or animatics presented by the application.

In one embodiment, the computing device translates the user motion data into multiple object responses of the on-screen object. The user motion data may be received from one or more users interacting with the application. The multiple object responses of the on-screen object may include a motion response, an audio response or a visual response of the on-screen object. The object responses may be simultaneously displayed via the user interface in the computing device to the users.

Figure 1:
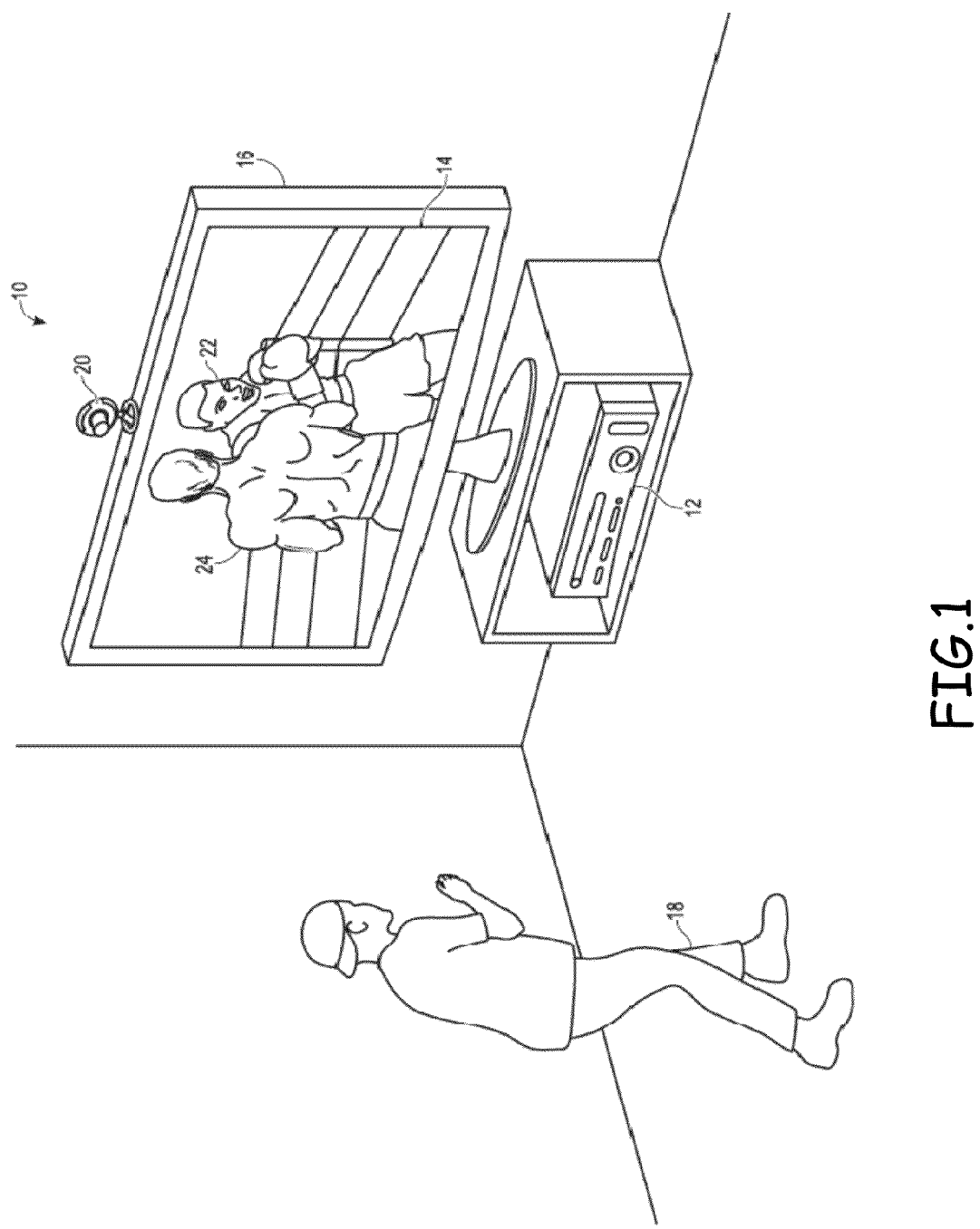
FIG. 1 illustrates one embodiment of a tracking system with a user playing a game.

FIG. 1 illustrates one embodiment of a target recognition, analysis and tracking system 10 (generally referred to as a tracking system hereinafter) for performing the operations of the disclosed technology. The target recognition, analysis and tracking system 10 may be used to recognize, analyze, and/or track a human target such as the user 18. As shown in FIG. 1, the tracking system 10 may include a computing device 12. The computing device 12 may be a computer, a gaming system or console, or the like. According to one embodiment, the computing device 12 may include hardware components and/or software components such that the computing device 12 may be used to execute applications such as gaming applications, non-gaming applications, or the like. In one embodiment, computing device 12 may include a processor such as a standardized processor, a specialized processor, a microprocessor, or the like that may execute instructions stored on a processor readable storage device for performing the processes described herein.

As shown in FIG. 1, the tracking system 10 may further include a capture device 20. The capture device 20 may be, for example, a camera that may be used to visually monitor one or more users, such as the user 18, such that gestures performed by the one or more users may be captured, analyzed, and tracked to control various aspects of an application executing on the computing device 12.

According to one embodiment, the tracking system 10 may be connected to an audiovisual device 16 such as a television, a monitor, a high-definition television (HDTV), or the like that may provide game or application visuals and/or audio to a user such as the user 18. For example, the computing device 12 may include a video adapter such as a graphics card and/or an audio adapter such as a sound card that may provide audiovisual signals associated with the game application, non-game application, or the like. The audiovisual device 16 may receive the audiovisual signals from the computing device 12 and may output the game or application visuals and/or audio associated with the audiovisual signals to the user 18. According to one embodiment, the audiovisual device 16 may be connected to the computing device 12 via, for example, an S-Video cable, a coaxial cable, an HDMI cable, a DVI cable, a VGA cable, or the like.

The target recognition, analysis and tracking system 10 may be used to recognize, analyze, and/or track one or more human targets such as the user 18. For example, the user 18 may be tracked using the capture device 20 such that the movements of user 18 may be interpreted as controls that may be used to affect an application or operating system being executed by computing device 12.

Figure 2:
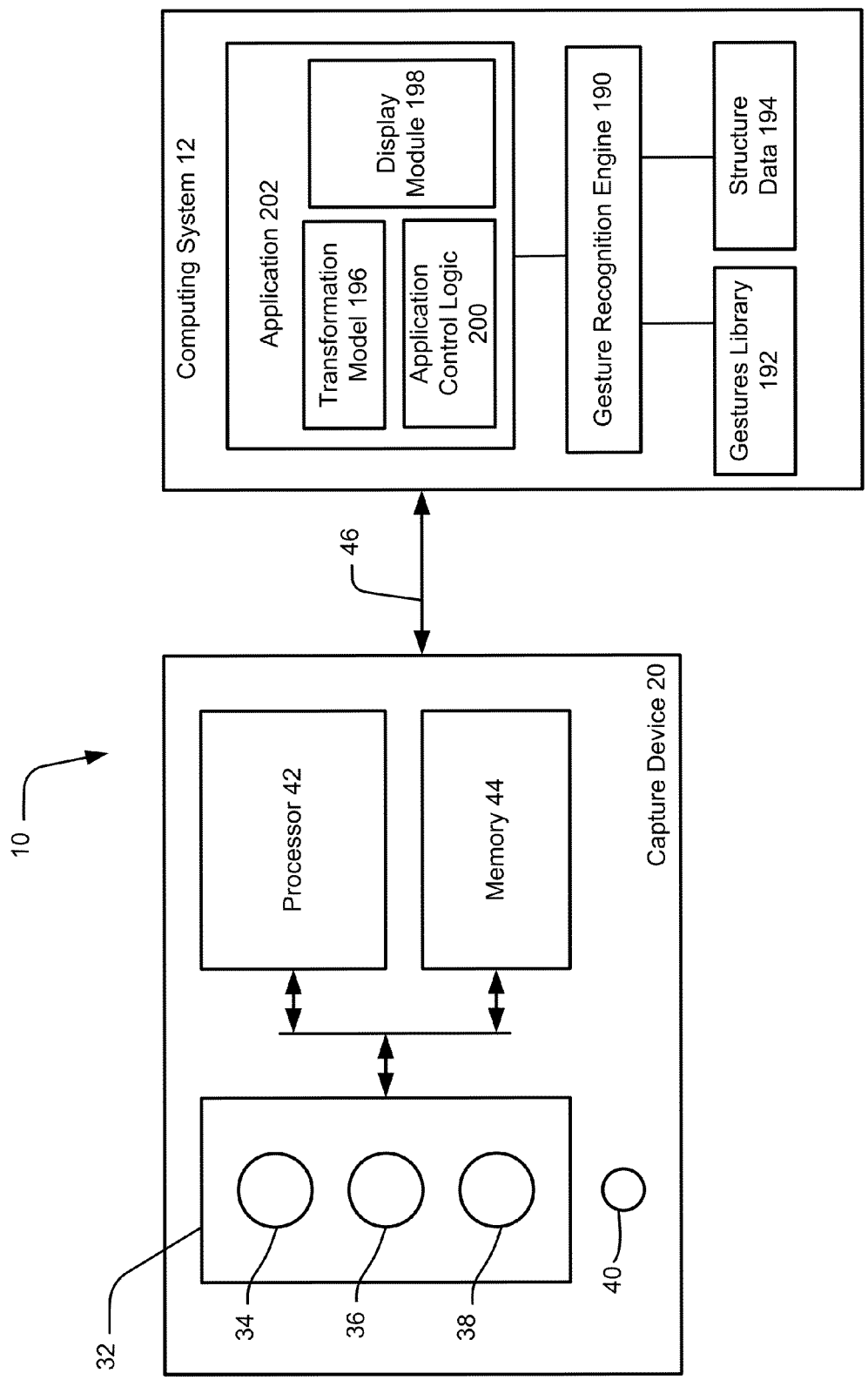
FIG. 2 illustrates one embodiment of a capture device that may be used as part of the tracking system.

FIG. 2 illustrates one embodiment of a capture device 20 and computing device 12 that may be used in the target recognition, analysis and tracking system 10 to recognize human and non-human targets in a capture area and uniquely identify them and track them in three dimensional space. According to one embodiment, the capture device 20 may be configured to capture video with depth information including a depth image that may include depth values via any suitable technique including, for example, time-of-flight, structured light, stereo image, or the like. According to one embodiment, the capture device 20 may organize the calculated depth information into "Z layers," or layers that may be perpendicular to a Z-axis extending from the depth camera along its line of sight.

As shown in FIG. 2, the capture device 20 may include an image camera component 32. According to one embodiment, the image camera component 32 may be a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

As shown in FIG. 2, the image camera component 32 may include an IR light component 34, a three-dimensional (3-D) camera 36, and an RGB camera 38 that may be used to capture the depth image of a capture area. For example, in time-of-flight analysis, the IR light component 34 of the capture device 20 may emit an infrared light onto the capture area and may then use sensors to detect the backscattered light from the surface of one or more targets and objects in the capture area using, for example, the 3-D camera 36 and/or the RGB camera 38. In some embodiments, pulsed infrared light may be used such that the time between an outgoing light pulse and a corresponding incoming light pulse may be measured and used to determine a physical distance from the capture device 20 to a particular location on the targets or objects in the capture area. Additionally, the phase of the outgoing light wave may be compared to the phase of the incoming light wave to determine a phase shift. The phase shift may then be used to determine a physical distance from the capture device to a particular location on the targets or objects.

According to one embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example, the capture device 20 may use structured light to capture depth information. In such an analysis, patterned light (i.e., light displayed as a known pattern such as grid pattern or a stripe pattern) may be projected onto the capture area via, for example, the IR light component 34. Upon striking the surface of one or more targets or objects in the capture area, the pattern may become deformed in response. Such a deformation of the pattern may be captured by, for example, the 3-D camera 36 and/or the RGB camera 38 and may then be analyzed to determine a physical distance from the capture device to a particular location on the targets or objects.

According to one embodiment, the capture device 20 may include two or more physically separated cameras that may view a capture area from different angles, to obtain visual stereo data that may be resolved to generate depth information. Other types of depth image sensors can also be used to create a depth image.

The capture device 20 may further include a microphone 40. The microphone 40 may include a transducer or sensor that may receive and convert sound into an electrical signal. According to one embodiment, the microphone 40 may be used to reduce feedback between the capture device 20 and the computing device 12 in the target recognition, analysis and tracking system 10. Additionally, the microphone 40 may be used to receive audio signals that may also be provided by the user to control applications such as game applications, non-game applications, or the like that may be executed by the computing device 12.

In one embodiment, the capture device 20 may further include a processor 42 that may be in operative communication with the image camera component 32. The processor 42 may include a standardized processor, a specialized processor, a microprocessor, or the like that may execute instructions that may include instructions for storing profiles, receiving the depth image, determining whether a suitable target may be included in the depth image, converting the suitable target into a skeletal representation or model of the target, or any other suitable instruction.

The capture device 20 may further include a memory component 44 that may store the instructions that may be executed by the processor 42, images or frames of images captured by the 3-D camera or RGB camera, user profiles or any other suitable information, images, or the like. According to one example, the memory component 44 may include random access memory (RAM), read only memory (ROM), cache, Flash memory, a hard disk, or any other suitable storage component. As shown in FIG. 2, the memory component 44 may be a separate component in communication with the image capture component 32 and the processor 42. In another embodiment, the memory component 44 may be integrated into the processor 42 and/or the image capture component 32. In one embodiment, some or all of the components 32, 34, 36, 38, 40, 42 and 44 of the capture device 20 illustrated in FIG. 2 are housed in a single housing.

The capture device 20 may be in communication with the computing device 12 via a communication link 46. The communication link 46 may be a wired connection including, for example, a USB connection, a Firewire connection, an Ethernet cable connection, or the like and/or a wireless connection such as a wireless 802.11b, g, a, or n connection. The computing device 12 may provide a clock to the capture device 20 that may be used to determine when to capture, for example, a scene via the communication link 46.

The capture device 20 may provide the depth information and images captured by, for example, the 3-D camera 36 and/or the RGB camera 38, including a skeletal model that may be generated by the capture device 20, to the computing device 12 via the communication link 46. The computing device 12 may then use the skeletal model, depth information, and captured images to, for example, create a virtual screen and control an application such as a game or word processor.

Computing device 12 includes gestures library 192, structure data 194 and a gesture recognition engine 190. Gestures library 192 may include a collection of gesture filters, each comprising information describing or defining a motion or gesture that may be performed by a skeletal model (as the user moves). Structure data 192 includes structural information about objects that may be tracked. For example, a skeletal model of a human may be stored to help understand movements of the user and recognize body parts. Structural information about inanimate objects may also be stored to help recognize those objects and help understand movement.

Gesture recognition engine 190 may compare the data captured by the cameras 36, 38 and device 20 in the form of the skeletal model and movements associated with it to the gesture filters in the gesture library 192 to identify when a user (as represented by the skeletal model) has performed one or more gestures. Computing device 12 may use the gestures library 192 to interpret movements of the skeletal model and to control an application based on the movements. More information about the gesture recognition engine 190 can be found in U.S. patent application Ser. No. 12/422,661, "Gesture Recognition System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool" filed on May 29, 2009, both of which are incorporated by reference herein in their entireties. More information about motion detection and tracking can be found in U.S. patent application Ser. No. 12/641,788, "Motion Detection Using Depth Images," filed on Dec. 18, 2009; and U.S. patent application Ser. No. 12/475,308, "Device for Identifying and Tracking Multiple Humans over Time," both of which are incorporated herein by reference in their entirety.

In one embodiment, computing device 12 may include an application 202. Application 202 may include a video game application, a movie application, shopping application, browsing application or other application executing in computing device 12. Application 202 enables user interaction with one or more on-screen objects presented by the application 202. The on-screen objects may correspond to, for example, non-traditional gameplay elements such as animate objects or in-animate objects displayed during non-interactive or static experiences, such as, for example, static movie sequences, story sequences, cinematic sequences or animatics presented by the application 202. Application 202 may include one or more scenes. Scenes in application 202 may include, for example, background information used to advance a plot during game play. For example, scenes in application 202 may include static movie sequences, story sequences, cinematic sequences or animatics presented by the application 202 that depict one or more animate or in-animate on-screen objects. In one example, the on-screen objects may correspond to objects other than an on-screen character representation of the user. In one embodiment, a user may interact with application 202 via a user interface in the user's computing device 12.

Application 202 may include a transformation model 196, a display module 198 and application control logic 200. Transformation model 196, display module 198 and application control logic 200 may be implemented as software modules to perform one or more operations of the disclosed technology. Application control logic 200 may include a collection of pre-programmed logic and/or rules related to the execution of application 202. In one embodiment, the rules specified by application control logic 200 may define the manner in which on-screen objects presented by application 202 may be controlled, based on a user's interaction with application 202. In one example, the rules specified by application control logic 200 may define a type of action to be performed on an on-screen object based on a user's interaction with application 202. As will be discussed in detail below, a user may perform a range of motions to interact with one or more on-screen objects depicted in an application, in which different user motions may result in similar or different corresponding object actions of the on-screen objects.

In one embodiment, gesture recognition engine 190 may provide a skeletal model of the human target and information about the movement of the human target to application control logic 200. Information about the movement of the human target may include, for example, the position, direction, acceleration and curvature of each body part associated with the human target, in one embodiment. Application control logic 200 may utilize this information to define the type of action to be performed on the on-screen objects displayed in application 202. In one embodiment, the rules specified by application control logic 200 may be implemented as a data structure that correlates a set of gestures identified by the gesture recognition engine 190 to a set of object responses of the on-screen object.

In another embodiment, application control logic 200 may also define an environmental context in which one or more of the on-screen objects of application 202 may be depicted. Accordingly, the type of action to be performed on an on-screen object may be based on information about user motion data (the movement of the human target) as well as the environmental context in which the on-screen objects are depicted. For example, an environmental context may correspond to a first context if an animate on-screen object such as a shark is depicted in an application. In such a context, the movement of a user's hip from left to right, for example, may result in an action that causes the fins of the shark to move back and forth, whereas in a second context which depicts an in-animate object such as a truck, the same motion may result in performing a swerving action on the truck.

Transformation model 196 may include executable instructions to perform specific actions on specific on-screen objects based on the rules defined by application control logic 200. In one embodiment, transformation model 196 may perform a specific action on the on-screen objects by automatically translating the user motion data into multiple object responses of the on-screen object. In one embodiment, transformation model 196 may perform the translation by accessing a corresponding response of the on-screen object from the data structure defined by application control logic 200. In one embodiment, the corresponding response of the on-screen object may include a motion response, a visual response or an audio response of the on-screen object. The transformation model 196 may then access code to implement the object response. In one embodiment, the object response may be implemented by mapping the skeletal model representation of the user to an object model representation of the on-screen object. For example, transformation model 196 may translate the user motion data into a corresponding motion response of the on-screen object by mapping the movement of a body part obtained from the skeletal model representation of the human target into a corresponding movement of a part in the on-screen object, based on an object model representation of the on-screen object. Similarly, transformation model 196 may translate the user motion data into a corresponding audio response or a visual response of the on-screen object by utilizing an object model representation of the on-screen object.

In one embodiment, transformation model 196 may utilize metadata related to the movement of the human target such as the velocity of the body part, the acceleration of the body part or the distance traveled by the body part in performing a particular movement to perform a corresponding translated motion of the on-screen object. For example, a higher velocity movement of a particular body part of the human target may result in translating the user motion data into a motion response of an on-screen object in which the on-screen object moves more quickly in response to higher velocity movements. Similarly, transformation model 196 may utilize metadata related to the movement of the human target such as the velocity of the body part, the acceleration of the body part or the distance traveled by the body part to trigger the audio response or the visual response of the on-screen object.

Display module 198 controls what is displayed to the user and may include executable instructions to display the multiple object responses of an on-screen object on a user interface of computing device 12 based on the information received from transformation model 196.

Figure 3:
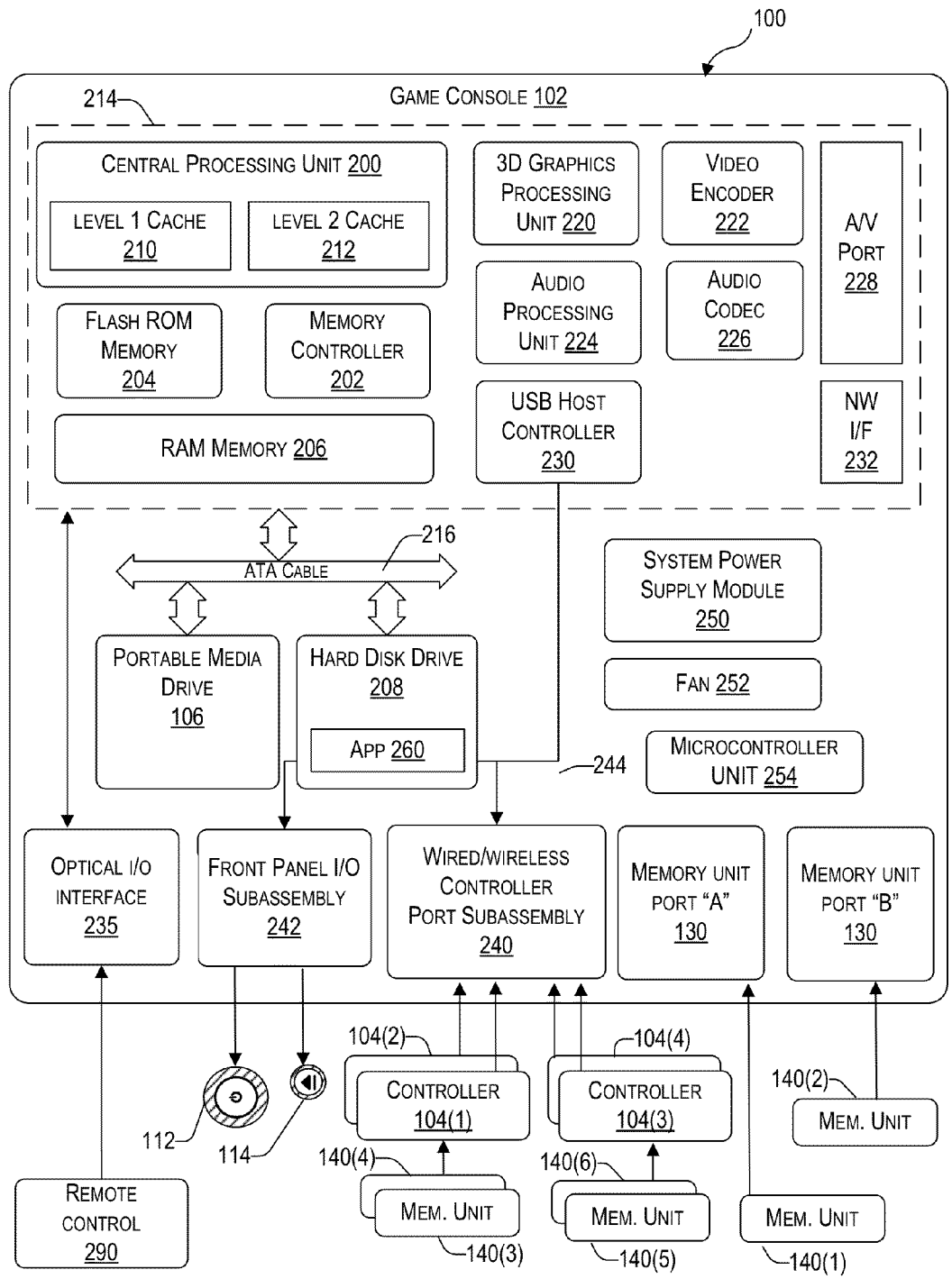
FIG. 3 illustrates one embodiment of a computing device that may be used to track motion and update an application based on the tracked motion.

FIG. 3 illustrates an example of a computing device 100 that may be used to implement the computing device 12 of FIG. 1-2. The computing device 100 of FIG. 3 may be a multimedia console 100, such as a gaming console. As shown in FIG. 3, the multimedia console 100 has a central processing unit (CPU) 200, and a memory controller 202 that facilitates processor access to various types of memory, including a flash Read Only Memory (ROM) 204, a Random Access Memory (RAM) 206, a hard disk drive 208, and portable media drive 106. In one implementation, CPU 200 includes a level 1 cache 210 and a level 2 cache 212, to temporarily store data and hence reduce the number of memory access cycles made to the hard drive 208, thereby improving processing speed and throughput.

CPU 200, memory controller 202, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 200, memory controller 202, ROM 204, and RAM 206 are integrated onto a common module 214. In this implementation, ROM 204 is configured as a flash ROM that is connected to memory controller 202 via a PCI bus and a ROM bus (neither of which are shown). RAM 206 is configured as multiple Double Data Rate Synchronous Dynamic RAM (DDR SDRAM) modules that are independently controlled by memory controller 202 via separate buses (not shown). Hard disk drive 208 and portable media drive 106 are shown connected to the memory controller 202 via the PCI bus and an AT Attachment (ATA) bus 216. However, in other implementations, dedicated data bus structures of different types can also be applied in the alternative.

A graphics processing unit 220 and a video encoder 222 form a video processing pipeline for high speed and high resolution (e.g., High Definition) graphics processing. Data are carried from graphics processing unit 220 to video encoder 222 via a digital video bus (not shown). An audio processing unit 224 and an audio codec (coder/decoder) 226 form a corresponding audio processing pipeline for multi-channel audio processing of various digital audio formats. Audio data are carried between audio processing unit 224 and audio codec 226 via a communication link (not shown). The video and audio processing pipelines output data to an A/V (audio/video) port 228 for transmission to a television or other display. In the illustrated implementation, video and audio processing components 220-228 are mounted on module 214.

FIG. 3 shows module 214 including a USB host controller 230 and a network interface 232. USB host controller 230 is shown in communication with CPU 200 and memory controller 202 via a bus (e.g., PCI bus) and serves as host for peripheral controllers 104(1)-104(4). Network interface 232 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 3, console 102 includes a controller support subassembly 240 for supporting four controllers 104(1)-104(4). The controller support subassembly 240 includes any hardware and software components needed to support wired and wireless operation with an external control device, such as for example, a media and game controller. A front panel I/O subassembly 242 supports the multiple functionalities of power button 112, the eject button 114, as well as any LEDs (light emitting diodes) or other indicators exposed on the outer surface of console 102. Subassemblies 240 and 242 are in communication with module 214 via one or more cable assemblies 244. In other implementations, console 102 can include additional controller subassemblies. The illustrated implementation also shows an optical I/O interface 235 that is configured to send and receive signals that can be communicated to module 214.

MUs 140(1) and 140(2) are illustrated as being connectable to MU ports "A" 130(1) and "B" 130(2) respectively. Additional MUs (e.g., MUs 140(3)-140(6)) are illustrated as being connectable to controllers 104(1) and 104(3), i.e., two MUs for each controller. Controllers 104(2) and 104(4) can also be configured to receive MUs (not shown). Each MU 140 offers additional storage on which games, game parameters, and other data may be stored. In some implementations, the other data can include any of a digital game component, an executable gaming application, an instruction set for expanding a gaming application, and a media file. When inserted into console 102 or a controller, MU 140 can be accessed by memory controller 202. A system power supply module 250 provides power to the components of gaming system 100. A fan 252 cools the circuitry within console 102.

An application 260 comprising machine instructions is stored on hard disk drive 208. When console 102 is powered on, various portions of application 260 are loaded into RAM 206, and/or caches 210 and 212, for execution on CPU 200, wherein application 260 is one such example. Various applications can be stored on hard disk drive 208 for execution on CPU 200.

Gaming and media system 100 may be operated as a standalone system by simply connecting the system to monitor 150 (FIG. 1), a television, a video projector, or other display device. In this standalone mode, gaming and media system 100 enables one or more players to play games, or enjoy digital media, e.g., by watching movies, or listening to music. However, with the integration of broadband connectivity made available through network interface 232, gaming and media system 100 may further be operated as a participant in a larger network gaming community.

Figure 4:
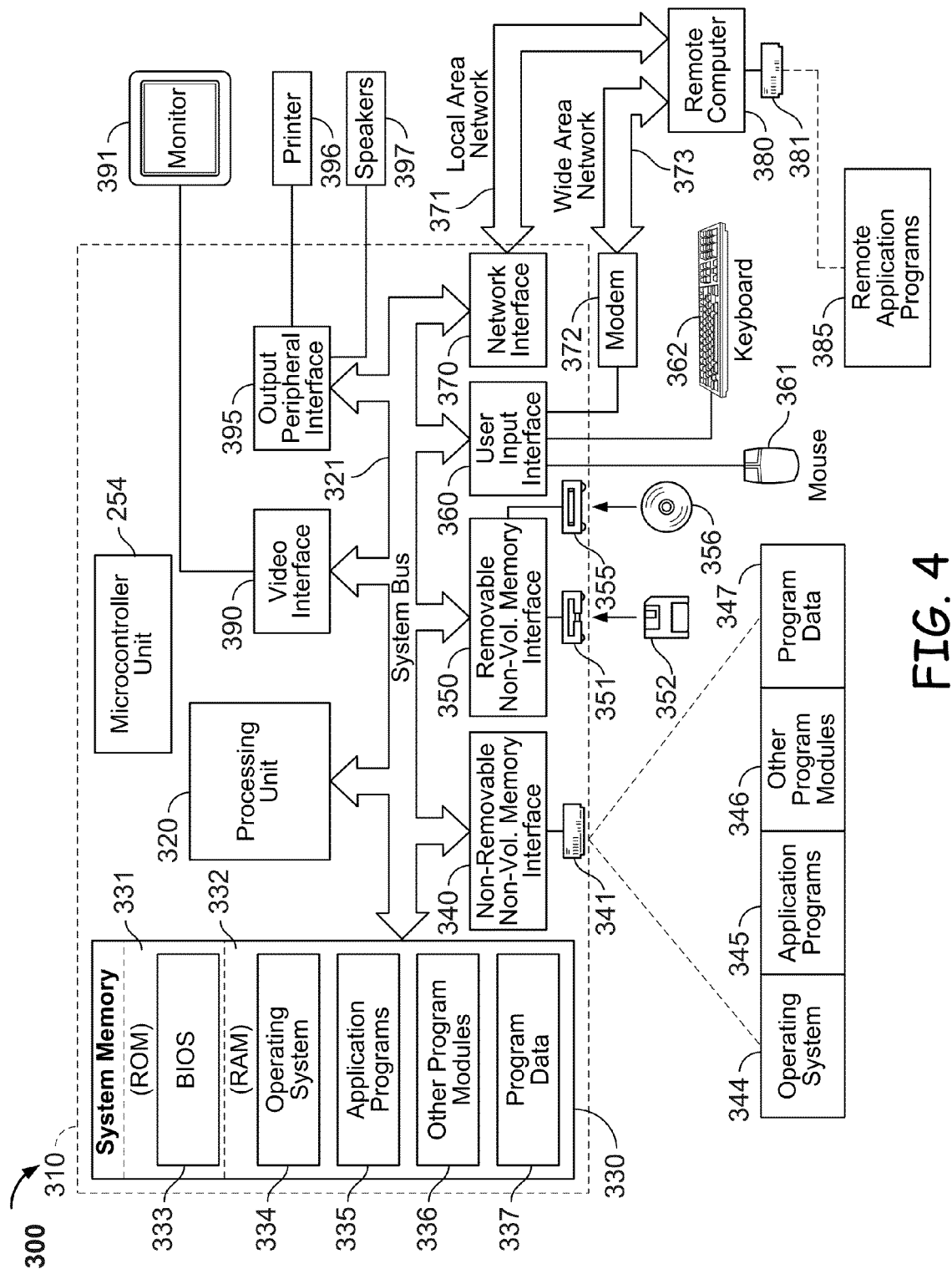
FIG. 4 illustrates one embodiment of a computing device that may be used to track motion and update an application based on the tracked motion.

FIG. 4 illustrates a general purpose computing device for implementing the operations of the disclosed technology. With reference to FIG. 4, an exemplary system for implementing embodiments of the disclosed technology includes a general purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 4 illustrates operating system 334, application programs 335, other program modules 336, and program data 337.

The computer 310 may also include other removable/non-removable, volatile/nonvolatile computer storage media. By way of example only, FIG. 4 illustrates a hard disk drive 340 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 4, provide storage of computer readable instructions, data structures, program modules and other data for the computer 310. In FIG. 4, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 20 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 390.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 4. The logical connections depicted in FIG. 4 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 4 illustrates remote application programs 385 as residing on memory device 381. It will be appreciated that the network connections shown are exemplary and other means of establishing a communications link between the computers may be used.

Figure 5:
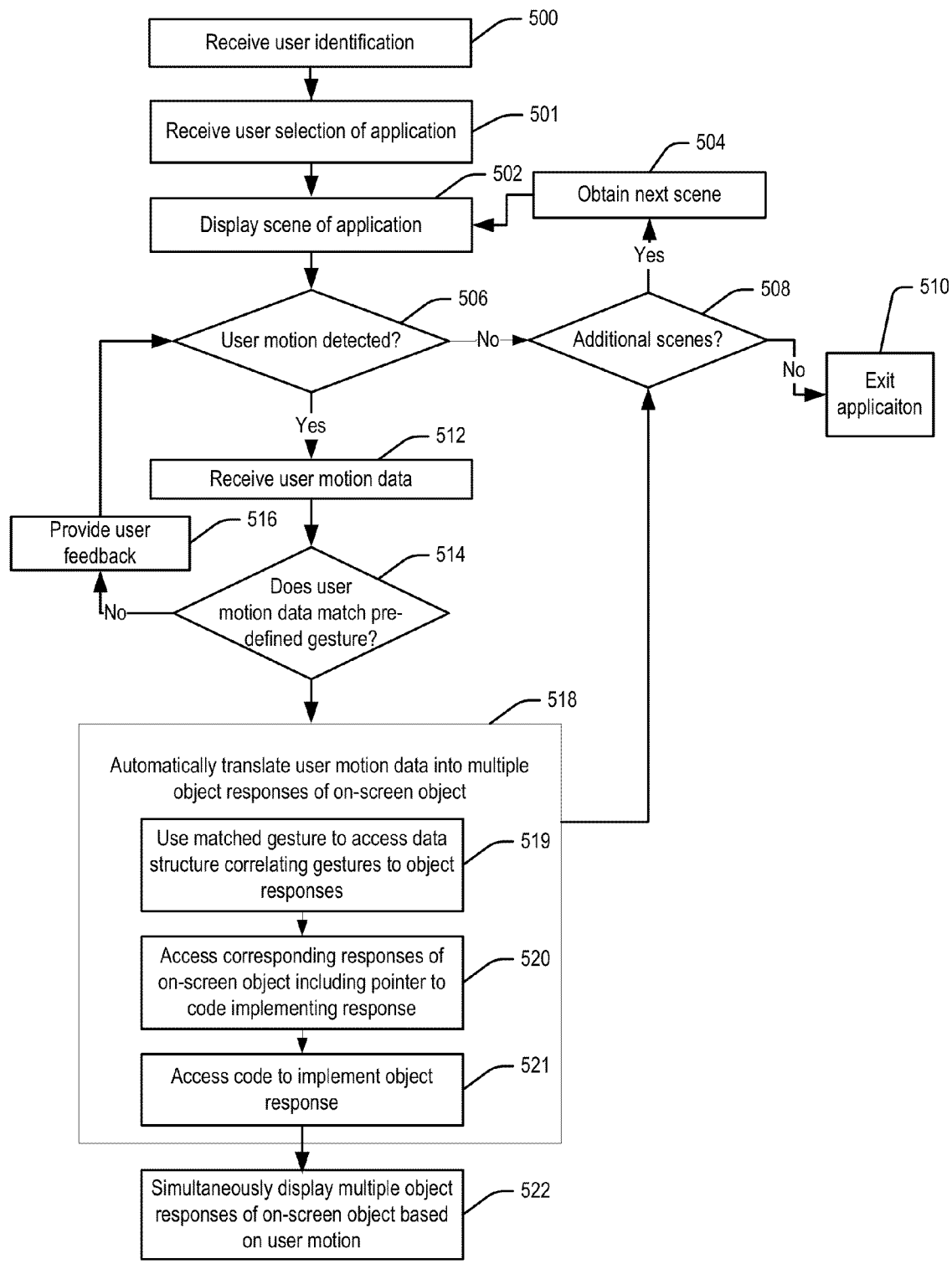
FIG. 5 is a flowchart describing one embodiment of a process for performing the operations of the disclosed technology.

The hardware devices of FIGS. 1-4 can be used to implement a system that allows the user to interact with objects in addition to an on-screen representation of the user. FIG. 5 is a flowchart describing one embodiment of a process for performing the operations of the disclosed technology. In one embodiment, the steps of FIG. 5 may be performed by software modules in the transformation model 196, display module 198 and/or application control logic 200 in the computing device 12 of system 10. A user's identity on computing device 12 is initially received, in step 500. In one example, step 500 may use facial recognition to correlate the user's face from a received visual image with a reference visual image to determine the user's identity. In another example, determining the user identity may include receiving input from the user identifying their identity. For example, a user profile may be stored by computing device 12 and the user may make an on screen selection to identify themselves as corresponding to that user profile. Upon successful user identification, user selection of an application, such as application 202 is received, in step 501. At step 501, the user may be prompted by a user interface in the user's computing device 12 to select an application 202. As discussed above, application 202 may include, for example, a video game application, a movie application or the like executing in computing device 12. In step 502, a scene of application 202 is displayed to the user.

In step 506, a check is made to determine if user motion is detected. If it is determined that user motion is detected, then user motion data is received in step 512. In one embodiment, the processor 42 in the capture device 20 may detect and receive information about the user's motion. The process by which user motion data may be detected and captured by the capture device 20 is discussed in FIG. 6. If no user motion data is detected, then a check is made to determine if the user wishes to interact with additional scenes of application 202, in step 508. If it is determined that the user wishes to interact with one or more additional scenes, then the next scene of application 202 is obtained in step 504 and the scene is displayed to the user in step 502. If it is determined that the user does not wish to interact with any additional scenes of application 202, then application 202 exits in step 510.

After capturing user motion in step 512, a check is made to determine if the user motion data matches a gesture, in step 514. A user may perform a range of motions to interact with one or more on-screen objects depicted in an application. In one embodiment, step 514 may include comparing the user motion data to one or more pre-defined gestures specified by the gesture recognition engine 190. The process of determining whether the user motion data matches a gesture may be performed by the gesture recognition engine 190 and is discussed in FIG. 7. If the user motion data matches a gesture, then the user motion data is automatically translated into multiple object responses of an on-screen object, in step 518. In one embodiment, the step 518 of translating the user motion data may be performed as follows. In step 519, the matched gesture obtained in step 514 is utilized to access the data structure correlating gestures to object responses as discussed in FIG. 2. In step 520, the corresponding response of the on-screen object is accessed from the data structure, including accessing a pointer to the code implementing the response. For example, the corresponding response of the on-screen object may include a motion response, a visual response or an audio response of the on-screen object. In step 521, the code to implement the object response is accessed. In one embodiment, the object response may be implemented by mapping the skeletal model representation of the user to an object model representation of the on-screen object as discussed in FIG. 2.

If the user motion data does not match a gesture, then at step 516, feedback regarding the different types of motion available to the user to interact with the on-screen objects is provided to the user, via the user interface of computing device 12. For example, a guide with text may be provided to the user regarding the different types of motions available to the user to interact with the various on-screen objects. User motion data may subsequently be captured at step 512, if user motion data is detected in step 506, based on the feedback provided to the user.

In step 522, the multiple object responses of the on-screen object are displayed to the user via a user interface in the user's computing device 12.

Figure 6:
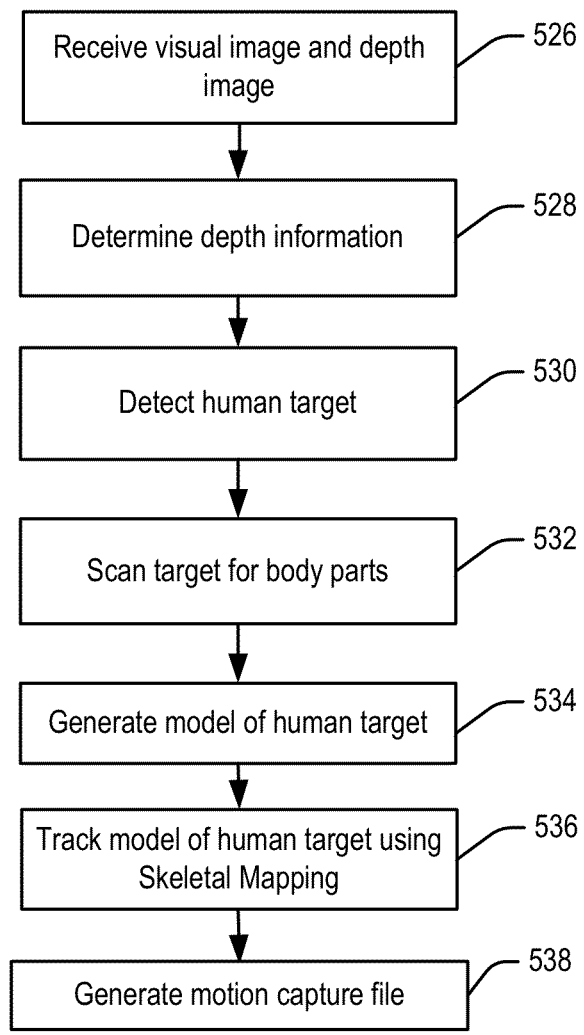
FIG. 6 is a flowchart describing one embodiment of a process for capturing user motion data, in accordance with the disclosed technology.

FIGS. 6-9 are flow charts that provide more details of various steps of FIG. 5B. FIG. 6 is a flowchart describing one embodiment of a process for capturing user motion data (step 512 of FIG. 5B). At step 526, processor 42 of the capture device 20 receives a visual image and depth image from the image capture component 32. In other examples, only a depth image is received at step 526. The depth image and visual image can be captured by any of the sensors in image capture component 32 or other suitable sensors as are known in the art. In one embodiment the depth image is captured separately from the visual image. In some implementations the depth image and visual image are captured at the same time while in others they are captured sequentially or at different times. In other embodiments the depth image is captured with the visual image or combined with the visual image as one image file so that each pixel has an R value, a G value, a B value and a Z value (representing distance).

At step 528 depth information corresponding to the visual image and depth image are determined. The visual image and depth image received at step 526 can be analyzed to determine depth values for one or more targets within the image. Capture device 20 may capture or observe a capture area that may include one or more targets.

At step 530 the capture device determines whether the depth image includes a human target. In one example, each target in the depth image may be flood filled and compared to a pattern to determine whether the depth image includes a human target. In one example, the edges of each target in the captured scene of the depth image may be determined. The depth image may include a two dimensional pixel area of the captured scene. Each pixel in the 2D pixel area may represent a depth value such as a length or distance for example as can be measured from the camera. The edges may be determined by comparing various depth values associated with for example adjacent or nearby pixels of the depth image. If the various depth values being compared are greater than a predetermined edge tolerance, the pixels may define an edge. The capture device may organize the calculated depth information including the depth image into Z layers or layers that may be perpendicular to a Z-axis extending from the camera along its line of sight to the viewer. The likely Z values of the Z layers may be flood filled based on the determined edges. For instance, the pixels associated with the determined edges and the pixels of the area within the determined edges may be associated with each other to define a target or an object in the capture area.

At step 532, the capture device scans the human target for one or more body parts. The human target can be scanned to provide measurements such as length, width or the like that are associated with one or more body parts of a user, such that an accurate model of the user may be generated based on these measurements. In one example, the human target is isolated and a bit mask is created to scan for the one or more body parts. The bit mask may be created for example by flood filling the human target such that the human target is separated from other targets or objects in the capture area elements.

At step 534 a model of the human target is generated based on the scan performed at step 532. The bit mask may be analyzed for the one or more body parts to generate a model such as a skeletal model, a mesh human model or the like of the human target. For example, measurement values determined by the scanned bit mask may be used to define one or more joints in the skeletal model. The bitmask may include values of the human target along an X, Y and Z-axis. The one or more joints may be used to define one or more bones that may correspond to a body part of the human.

According to one embodiment, to determine the location of the neck, shoulders, or the like of the human target, a width of the bitmask, for example, at a position being scanned, may be compared to a threshold value of a typical width associated with, for example, a neck, shoulders, or the like. In an alternative embodiment, the distance from a previous position scanned and associated with a body part in a bitmask may be used to determine the location of the neck, shoulders or the like.

In one embodiment, to determine the location of the shoulders, the width of the bitmask at the shoulder position may be compared to a threshold shoulder value. For example, a distance between the two outer most Y values at the X value of the bitmask at the shoulder position may be compared to the threshold shoulder value of a typical distance between, for example, shoulders of a human. Thus, according to an example embodiment, the threshold shoulder value may be a typical width or range of widths associated with shoulders of a body model of a human.

In one embodiment, some body parts such as legs, feet, or the like may be calculated based on, for example, the location of other body parts. For example, as described above, the information such as the bits, pixels, or the like associated with the human target may be scanned to determine the locations of various body parts of the human target. Based on such locations, subsequent body parts such as legs, feet, or the like may then be calculated for the human target.

According to one embodiment, upon determining the values of, for example, a body part, a data structure may be created that may include measurement values such as length, width, or the like of the body part associated with the scan of the bitmask of the human target. In one embodiment, the data structure may include scan results averaged from a plurality depth images. For example, the capture device may capture a capture area in frames, each including a depth image. The depth image of each frame may be analyzed to determine whether a human target may be included as described above. If the depth image of a frame includes a human target, a bitmask of the human target of the depth image associated with the frame may be scanned for one or more body parts. The determined value of a body part for each frame may then be averaged such that the data structure may include average measurement values such as length, width, or the like of the body part associated with the scans of each frame. In one embodiment, the measurement values of the determined body parts may be adjusted such as scaled up, scaled down, or the like such that measurements values in the data structure more closely correspond to a typical model of a human body. Measurement values determined by the scanned bitmask may be used to define one or more joints in a skeletal model at step 534.

At step 536 the model created in step 534 is tracked using skeletal mapping. For example, the skeletal model of the user 18 may be adjusted and updated as the user moves in physical space in front of the camera within the field of view. Information from the capture device may be used to adjust the model so that the skeletal model accurately represents the user. In one example this is accomplished by one or more forces applied to one or more force receiving aspects of the skeletal model to adjust the skeletal model into a pose that more closely corresponds to the pose of the human target and physical space.

At step 538, motion is captured based on the skeletal mapping to generate a motion capture file. In one embodiment, step 538 of capturing motion may include calculating the position, direction, acceleration and curvature of one or more body parts identified by the scan. The position of the body part is calculated in X, Y, Z space to create a three dimensional positional representation of the body part within the field of view of the camera. The direction of movement of the body part is calculated, dependent upon the position. The directional movement may have components in any one of or a combination of the X, Y, and Z directions. The curvature of the body part's movement in the X, Y, Z space is determined, for example, to represent non-linear movement within the capture area by the body part. The velocity, acceleration and curvature calculations are not dependent upon the direction. It is to be appreciated that the use of X, Y, Z Cartesian mapping is provided only as an example. In other embodiments, different coordinate mapping systems can be used to calculate movement, velocity and acceleration. A spherical coordinate mapping, for example, may be useful when examining the movement of body parts which naturally rotate around joints.

Once all body parts in the scan have been analyzed, the motion capture file generated in step 538 may be updated for the target. In one example, the motion capture file is generated in real time based on information associated with the tracked model. For example, in one embodiment the motion capture file may include the vectors including X, Y, and Z values that define the joints and bones of the model as it is being tracked at various points in time. As described above, the model being tracked may be adjusted based on user motions at various points in time and a motion capture file of the model for the motion may be generated and stored. The motion capture file may capture the tracked model during natural movement by the user interacting with the target recognition analysis and tracking system. For example, the motion capture file may be generated such that the motion capture file may naturally capture any movement or motion by the user during interaction with the target recognition analysis and tracking system. The motion capture file may include frames corresponding to, for example, a snapshot of the motion of the user at different points in time. Upon capturing the tracked model, information associated with the model including any movements or adjustment applied thereto at a particular point in time may be rendered in a frame of the motion capture file. The information in the frame may include for example the vectors including the X, Y, and Z values that define the joints and bones of the tracked model and a time stamp that may be indicative of a point in time in which for example the user performed the movement corresponding to the pose of the tracked model.

In one embodiment, steps 526-538 are performed by computing device 12. Furthermore, although steps 526-538 are described as being performed by capture device 20, various ones of these steps may be performed by other components, such as by computing device 12. For example, the capture device 20 may provide the visual and/or depth images to the computing device 12 which will in turn, determine depth information, detect the human target, scan the target, generate and track the model and capture motion of the human target.

Figure 7:
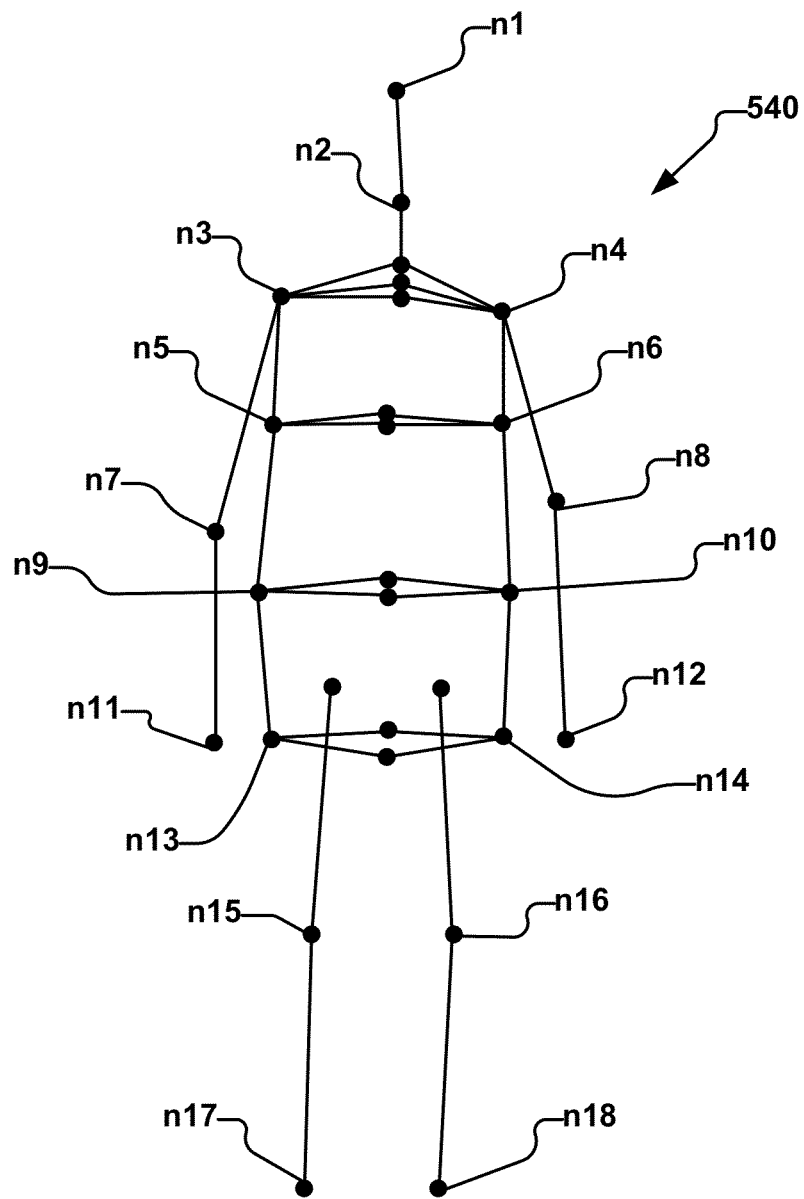
FIG. 7 illustrates an example of a skeletal model or mapping representing a scanned human target.

FIG. 7 illustrates an example of a skeletal model or mapping 540 representing a scanned human target that may be generated at step 534 of FIG. 6. According to one embodiment, the skeletal model 540 may include one or more data structures that may represent a human target as a three-dimensional model. Each body part may be characterized as a mathematical vector defining joints and bones of the skeletal model 540.

Skeletal model 540 includes joints n1-n18. Each of the joints n1-n18 may enable one or more body parts defined there between to move relative to one or more other body parts. A model representing a human target may include a plurality of rigid and/or deformable body parts that may be defined by one or more structural members such as "bones" with the joints n1-n18 located at the intersection of adjacent bones. The joints n1-n18 may enable various body parts associated with the bones and joints n1-n18 to move independently of each other or relative to each other. For example, the bone defined between the joints n7 and n11 corresponds to a forearm that may be moved independent of, for example, the bone defined between joints n15 and n17 that corresponds to a calf. It is to be understood that some bones may correspond to anatomical bones in a human target and/or some bones may not have corresponding anatomical bones in the human target.

The bones and joints may collectively make up a skeletal model, which may be a constituent element of the model. An axial roll angle may be used to define a rotational orientation of a limb relative to its parent limb and/or the torso. For example, if a skeletal model is illustrating an axial rotation of an arm, a roll joint may be used to indicate the direction the associated wrist is pointing (e.g., palm facing up). By examining an orientation of a limb relative to its parent limb and/or the torso, an axial roll angle may be determined. For example, if examining a lower leg, the orientation of the lower leg relative to the associated upper leg and hips may be examined in order to determine an axial roll angle.

Figure 8:
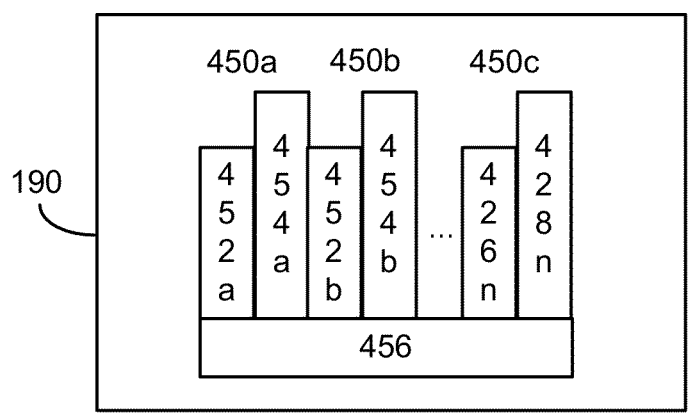
FIG. 8 provides further details of an exemplary embodiment of the gesture recognition engine shown in FIG. 2.

FIG. 8 provides further details of an exemplary embodiment of the gesture recognition engine 190 shown in FIG. 2. As shown, the gesture recognition engine 190 may comprise at least one filter 450 to determine a gesture or gestures. A filter 450 comprises parameters defining a gesture 452 (hereinafter referred to as a "gesture") along with metadata 454 for that gesture. A filter may comprise code and associated data that can recognize gestures or otherwise process depth, RGB, or skeletal data. For instance, a throw, which comprises motion of one of the hands from behind the rear of the body to past the front of the body, may be implemented as a gesture 452 comprising information representing the movement of one of the hands of the user from behind the rear of the body to past the front of the body, as that movement would be captured by the depth camera. Parameters 454 may then be set for that gesture 452. Where the gesture 452 is a throw, a parameter 454 may be a threshold velocity that the hand has to reach, a distance the hand must travel (either absolute, or relative to the size of the user as a whole), and a confidence rating by the recognition engine that the gesture occurred. These parameters 454 for the gesture 452 may vary between applications, between contexts of a single application, or within one context of one application over time. Gesture parameters may include threshold angles (e.g., hip-thigh angle, forearm-bicep angle, etc.), a number of periods where motion occurs or does not occur, a threshold period, threshold position (starting, ending), direction of movement, velocity, acceleration, coordination of movement, etc.

A filter may comprise code and associated data that can recognize gestures or otherwise process depth, RGB, or skeletal data. Filters may be modular or interchangeable. In an embodiment, a filter has a number of inputs, each of those inputs having a type, and a number of outputs, each of those outputs having a type. In this situation, a first filter may be replaced with a second filter that has the same number and types of inputs and outputs as the first filter without altering any other aspect of the gesture recognition engine architecture. For instance, there may be a first filter for driving that takes as input skeletal data and outputs a confidence that the gesture associated with the filter is occurring and an angle of steering. Where one wishes to substitute this first driving filter with a second driving filter—perhaps because the second driving filter is more efficient and requires fewer processing resources—one may do so by simply replacing the first filter with the second filter so long as the second filter has those same inputs and outputs—one input of skeletal data type, and two outputs of confidence type and angle type.

A filter need not have a parameter. For instance, a "user height" filter that returns the user's height may not allow for any parameters that may be tuned. An alternate "user height" filter may have tunable parameters—such as to whether to account for a user's footwear, hairstyle, headwear and posture in determining the user's height.

Inputs to a filter may comprise things such as joint data about a user's joint position, like angles formed by the bones that meet at the joint, RGB color data from the capture area, and the rate of change of an aspect of the user. Outputs from a filter may comprise things such as the confidence that a given gesture is being made, the speed at which a gesture motion is made, and a time at which a gesture motion is made.

The gesture recognition engine 190 may have a base recognition engine 456 that provides functionality to a gesture filter 450. In an embodiment, the functionality that the base recognition engine 456 implements includes an input-over-time archive that tracks recognized gestures and other input, a Hidden Markov Model implementation (where the modeled system is assumed to be a Markov process—one where a present state encapsulates any past state information necessary to determine a future state, so no other past state information must be maintained for this purpose—with unknown parameters, and hidden parameters are determined from the observable data), as well as other functionality required to solve particular instances of gesture recognition.

Filters 450 are loaded and implemented on top of the base recognition engine 456 and can utilize services provided by the engine 456 to all filters 450. In an embodiment, the base recognition engine 456 processes received data to determine whether it meets the requirements of any filter 450. Since these provided services, such as parsing the input, are provided once by the base recognition engine 456 rather than by each filter 450, such a service need only be processed once in a period of time as opposed to once per filter 450 for that period, so the processing required to determine gestures is reduced.

An application may use the filters 450 provided by the recognition engine 190, or it may provide its own filter 450, which plugs in to the base recognition engine 456. In an embodiment, all filters 450 have a common interface to enable this plug-in characteristic. Further, all filters 450 may utilize parameters 454, so a single gesture tool as described below may be used to debug and tune the entire filter system. These parameters 454 may be tuned for an application or a context of an application by a gesture tool.

There are a variety of outputs that may be associated with the gesture. In one example, there may be a baseline "yes or no" as to whether a gesture is occurring. In another example, there may be a confidence level, which corresponds to the likelihood that the user's tracked movement corresponds to the gesture. This could be a linear scale that ranges over floating point numbers between 0 and 1, inclusive. Where an application receiving this gesture information cannot accept false-positives as input, it may use only those recognized gestures that have a high confidence level, such as at least 0.95, for example. Where an application must recognize every instance of the gesture, even at the cost of false-positives, it may use gestures that have at least a much lower confidence level, such as those merely greater than 0.2, for example. The gesture may have an output for the time between the two most recent steps, and where only a first step has been registered, this may be set to a reserved value, such as −1 (since the time between any two steps must be positive). The gesture may also have an output for the highest thigh angle reached during the most recent step.

A gesture or a portion thereof may have as a parameter a volume of space in which it must occur. This volume of space may typically be expressed in relation to the body where a gesture comprises body movement. For instance, a football throwing gesture for a right-handed user may be recognized only in the volume of space no lower than the right shoulder 410a, and on the same side of the head 422 as the throwing arm 402a-410a. It may not be necessary to define all bounds of a volume, such as with this throwing gesture, where an outer bound away from the body is left undefined, and the volume extends out indefinitely, or to the edge of capture area that is being monitored.

In addition, gestures may stack on each other. That is, more than one gesture may be expressed by a user at a single time. For instance, rather than disallowing any input but a throw when a throwing gesture is made, or requiring that a user remain motionless save for the components of the gesture (e.g. stand still while making a throwing gesture that involves only one arm). Where gestures stack, a user may make a jumping gesture and a throwing gesture simultaneously, and both of these gestures will be recognized by the gesture engine.

Figure 9:
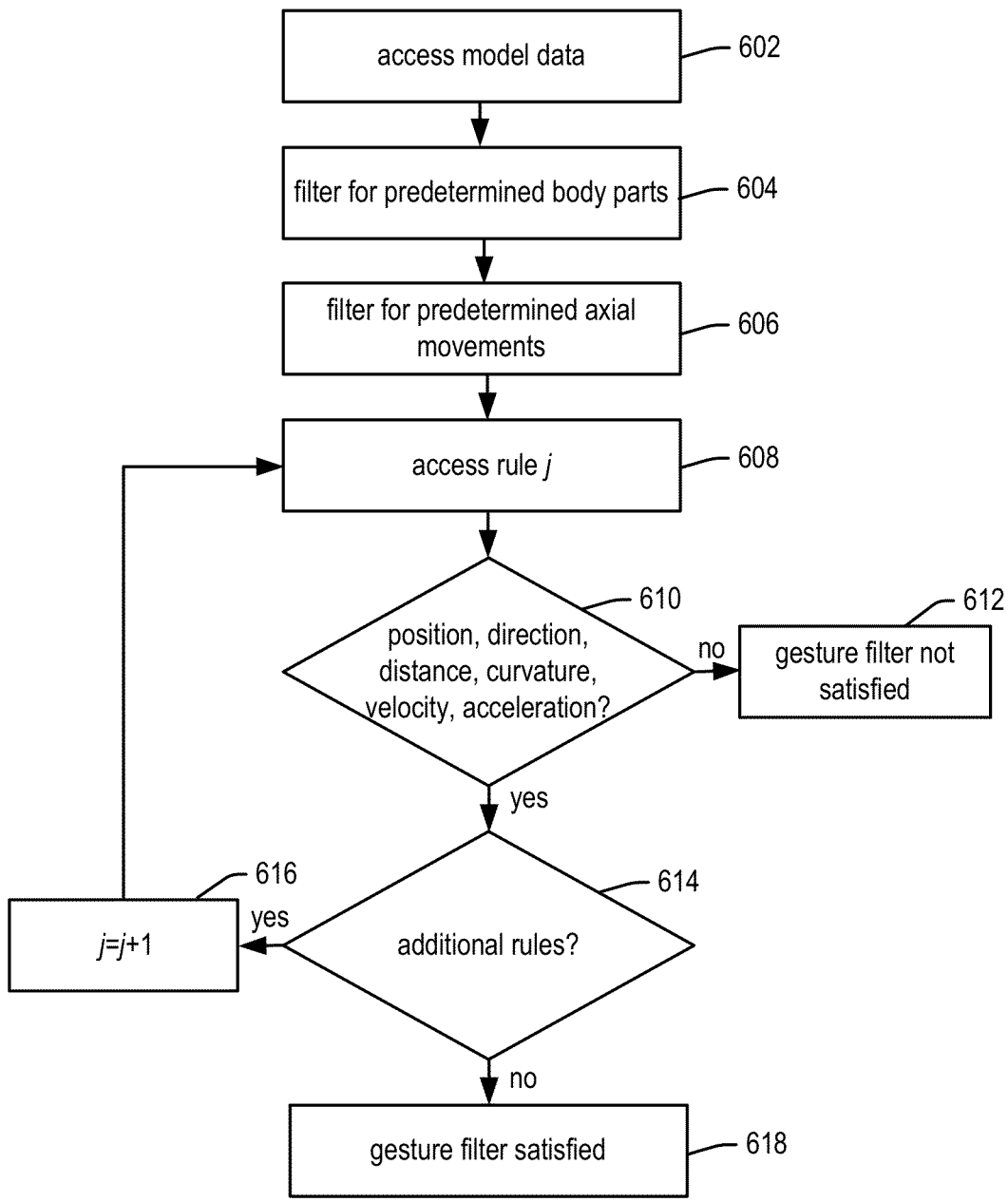
FIG. 9 is a flowchart describing one embodiment of a process for determining if the user motion data matches a gesture, in accordance with the disclosed technology.

FIG. 9 is a flowchart describing one embodiment of a process for performing step 514 of FIG. 5B of determining if the user motion data matches a gesture, in accordance with the disclosed technology. FIG. 9 describes a rule based approach for applying one or more gesture filters by the gesture recognition engine 190 to determine whether a user's motion matches a particular gesture. It will be appreciated that the process of FIG. 9 may be performed multiple times to detect multiple gestures in the active gesture set although detection of a single gesture is described in the particular example. The described process may be performed in parallel or in sequence for multiple active gestures.

At step 602, the gesture recognition engine accesses the skeletal tracking data for a particular target to begin determining whether that target has performed a selected gesture. The skeletal tracking data can be accessed from a motion capture file, as discussed in FIG. 6. At step 604, the gesture recognition engine filters the skeletal tracking data for one or more predetermined body parts pertinent to the selected gesture as identified in the selected gesture filter. Step 604 can include accessing only that data which is pertinent to the selected gesture, or accessing all skeletal tracking data for the target and ignoring or discarding information not pertinent to the selected gesture. For example, a hand gesture filter may indicate that only a human target's hand is pertinent to the selected gesture such that data pertaining to other body parts can be ignored. Such a technique can increase the performance of the gesture recognition engine by limiting processing to that information predetermined to be salient to the selected gesture.

At step 606, the gesture recognition engine filters the skeletal tracking data for predetermined axial movements. For example, the selected gesture's filter may specify that only movements along a subset of axes are relevant.

At step 608, the gesture recognition engine accesses a rule j specified in the gesture filter. In the first iteration through the process of FIG. 9, j is equal to 1. A gesture may include a plurality of parameters that need to be satisfied in order for the gesture to be recognized. Each one of these parameters can be specified in a separate rule, although multiple components can be included in a single rule. A rule may specify a threshold distance, position, direction, curvature, velocity and/or acceleration, among other parameters, that a target's body part must meet in order for the gesture to be satisfied. A rule may apply to one body part or multiple body parts. Moreover, a rule may specify a single parameter such as position or multiple parameters such as position, direction, distance, curvature, velocity and acceleration.

At step 610, the gesture recognition engine compares the skeletal tracking data filtered at steps 604 and 606 with the specified parameter(s) of the rule to determine whether the rule is satisfied. For example, the gesture recognition engine may determine whether a hand's starting position was within a threshold distance of a starting position parameter. The rule may further specify and the engine determine whether the hand moved in a specified direction, moved a threshold distance from the starting position in the specified direction; moved within a threshold curvature along a specified axis, moved at or above a specified velocity; reached or exceeded a specified acceleration. If the engine determines that the skeletal tracking information does not meet the parameters specified in the filter rule, the engine returns a fail or gesture filter not satisfied response at step 612. The response may be returned to an application 202 executing on computing device 12.

At step 614 the gesture recognition engine determines whether the gesture filter specifies additional rules that must be met for the gesture to be completed. If additional rules are included in the filter, j is incremented by one and the process returns to step 608 where the next rule is accessed. If there are no additional rules, the gesture recognition engine returns an indication that the gesture filter has been satisfied at step 618.

Steps 612 and 618 of FIG. 9 return a simple pass/fail response for the gesture being analyzed. In other examples, rather than return a simple pass/fail response, FIG. 9 will return a confidence level that the gesture's filter was satisfied. For each rule in the filter, an amount by which the target's movement meets or does not meet a specified parameter is determined. Based on an aggregation of these amounts, the recognition engine returns a confidence level that the gesture was indeed performed by the target.

Figure 10:
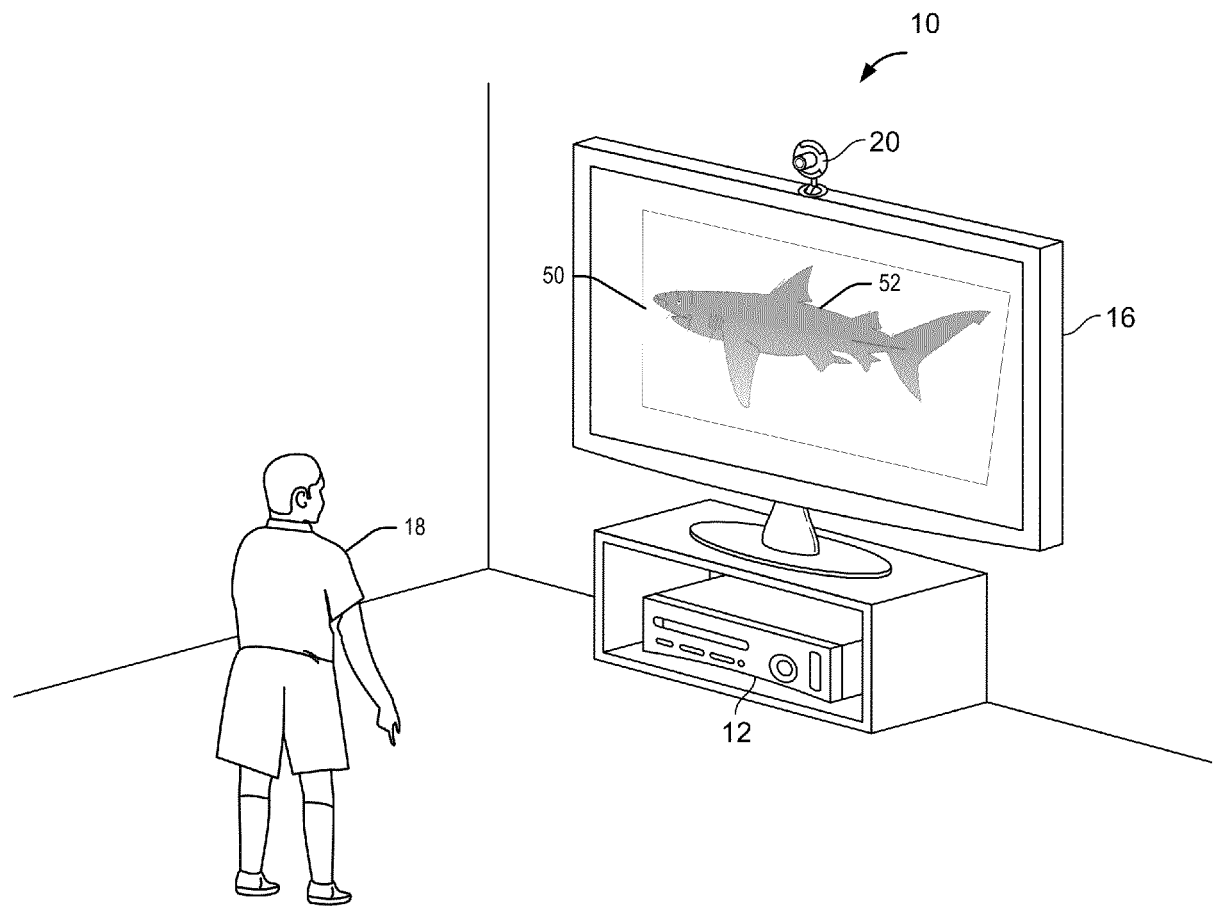
FIGS. 10-14 illustrate various user interface screens depicting user interaction with an application executing on a computing device, in accordance with the disclosed technology.
Figure 11:
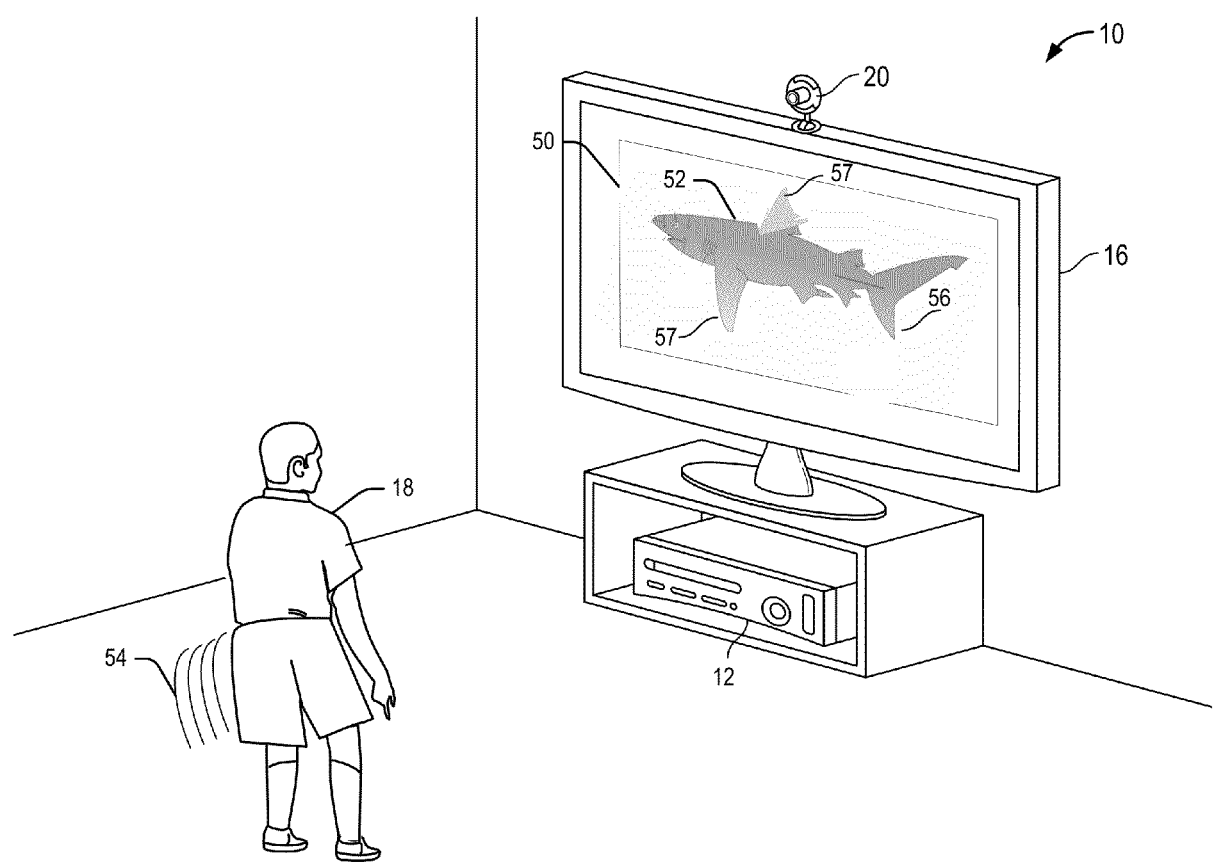

FIGS. 10-14 illustrate various user interface screens depicting user interaction with an application executing on a computing device. FIGS. 10-11 illustrate an exemplary user interaction with an application via a user interface in computing device 12 and a result of the user interaction with the application. FIG. 10 illustrates a user 18 interacting with an application 202 via a user interface in computing device 12. FIG. 11 illustrates a result of the user interaction with the application shown in FIG. 10. In the exemplary illustration shown in FIG. 11, the user 18 interacts with a shark object 52 depicted in a scene, 50, of application 202 by performing an exemplary motion, such as a hip motion 54. A result of the user interaction is illustrated in which the hip motion 54 is translated into multiple motion responses 56, 57 of the fins of the shark. As further illustrated, the multiple object responses 56, 57 are simultaneously displayed to the user 18, via the user interface.

In another embodiment, more than one user may simultaneously interact with an application 202 executing in the computing device 12. Accordingly, a first user motion data may be received from a first user and a second user motion data may be received from a second user interacting with an on-screen object depicted in application 202. The first user motion data may be translated into a first motion response and the second user motion data may be translated into a second motion response. The first and second responses of the on-screen object may be displayed simultaneously to the users, via the user interface in the computing device 12. In one embodiment, the second object response may be different from the first object response when the second user motion data is different from the first user motion data. Alternatively, the second object response may be an amplification of the first user response, when the second user motion data is identical to the first user motion data. An amplified response may be determined, for example, based on the velocity or acceleration of the sensed motion of the user, in which the on-screen object may move more quickly in response to higher velocity movements.

Figure 12:
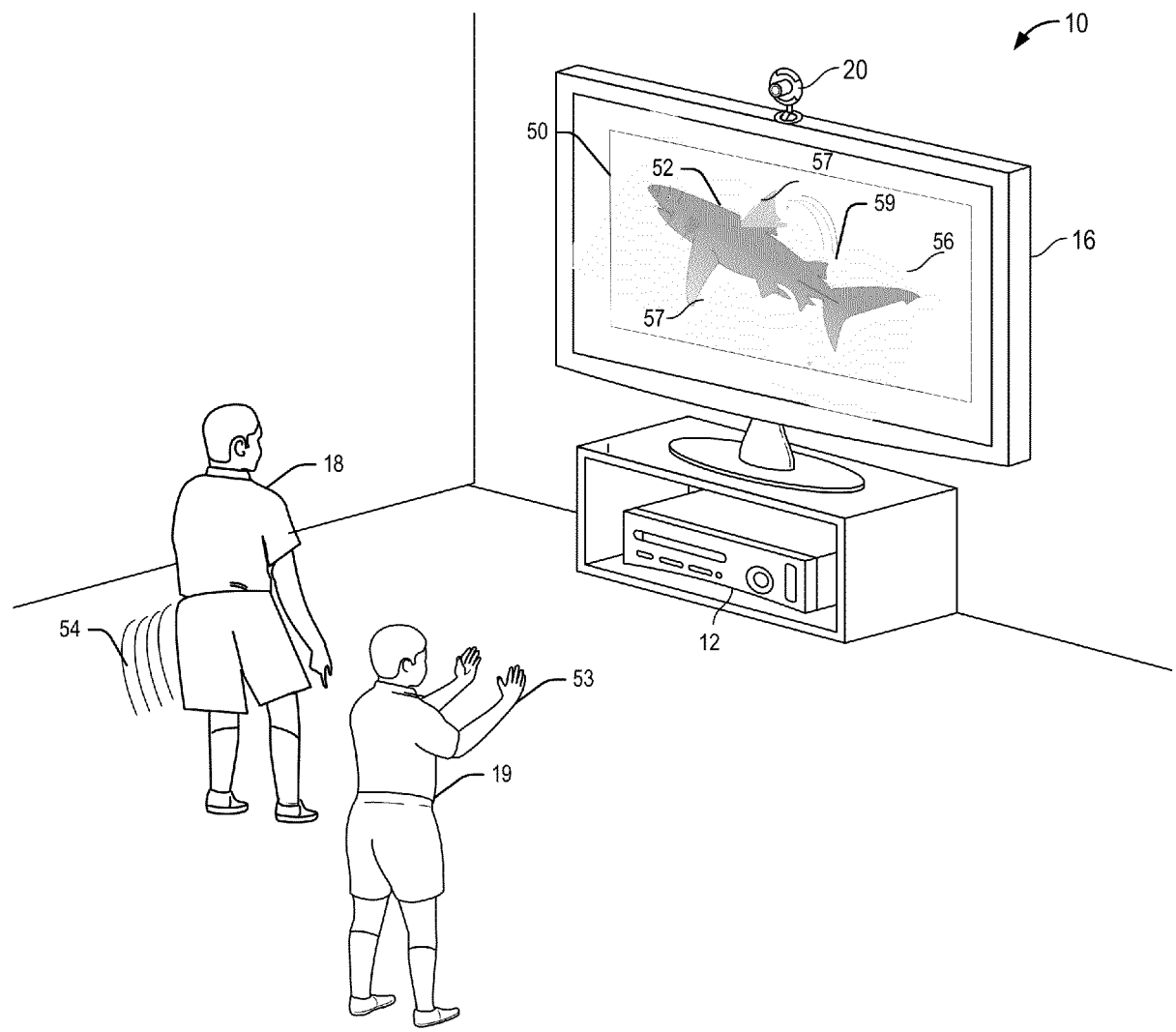

FIG. 12 is an exemplary illustration of a first user 18 and a second user 19 interacting with an on-screen object 52 depicted in application 202 executing in computing device 12. In the exemplary illustration, the first user 18 performs a hip motion 54 to interact with the shark object 52 depicted in scene 50 of application 202. The second user 19 performs a hand motion 53 to interact with the same shark object 52. A result of both the users' interaction with the shark object 52 is simultaneously displayed in FIG. 12, in which the hip motion 54 is translated into a first motion response that results in multiple motions 56, 57 of the fins of the shark object 52 and the hand motion 53 is translated into a second motion response that results in a motion 59 of the body of the shark object 52.

Figure 13:
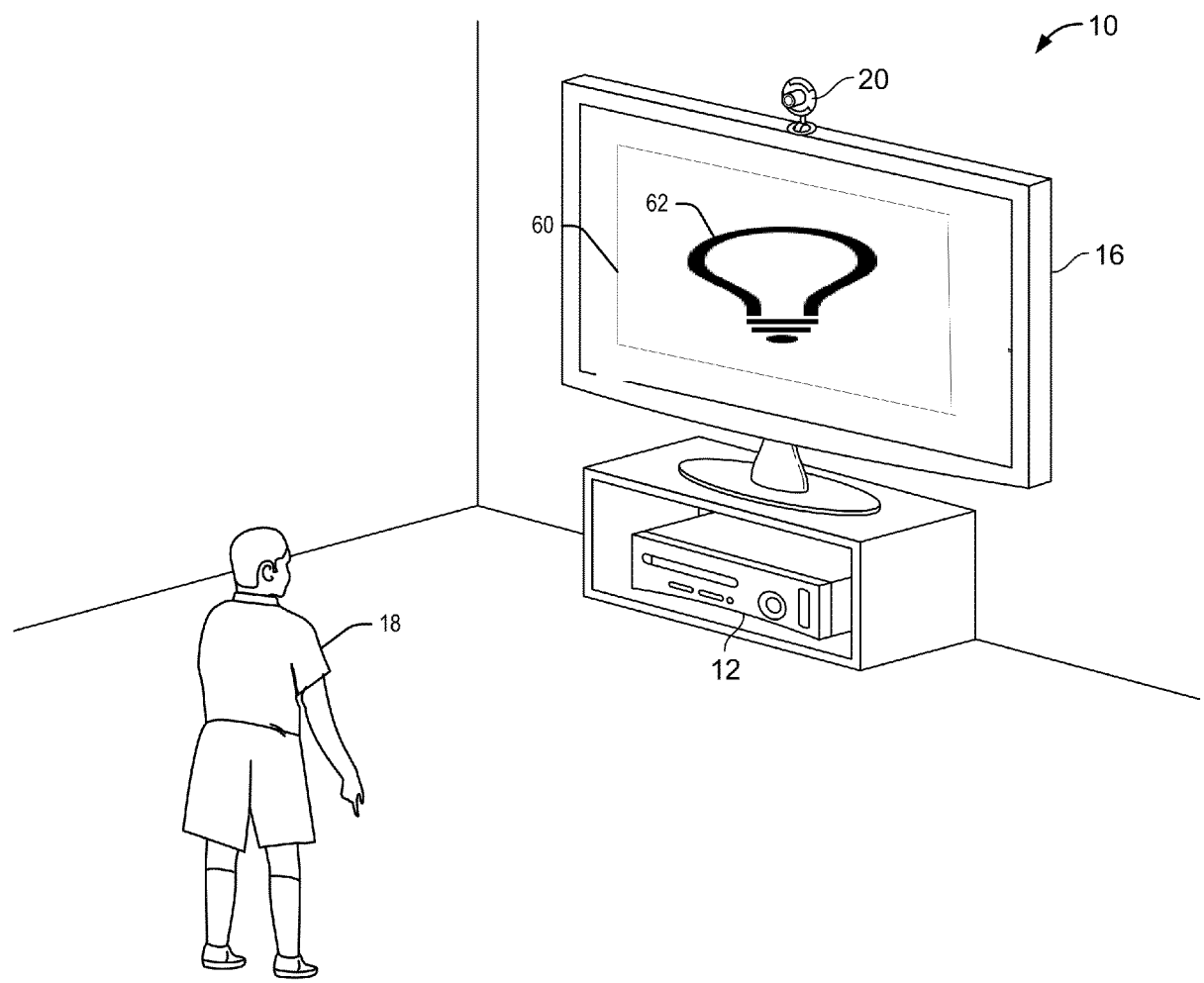
Figure 14:
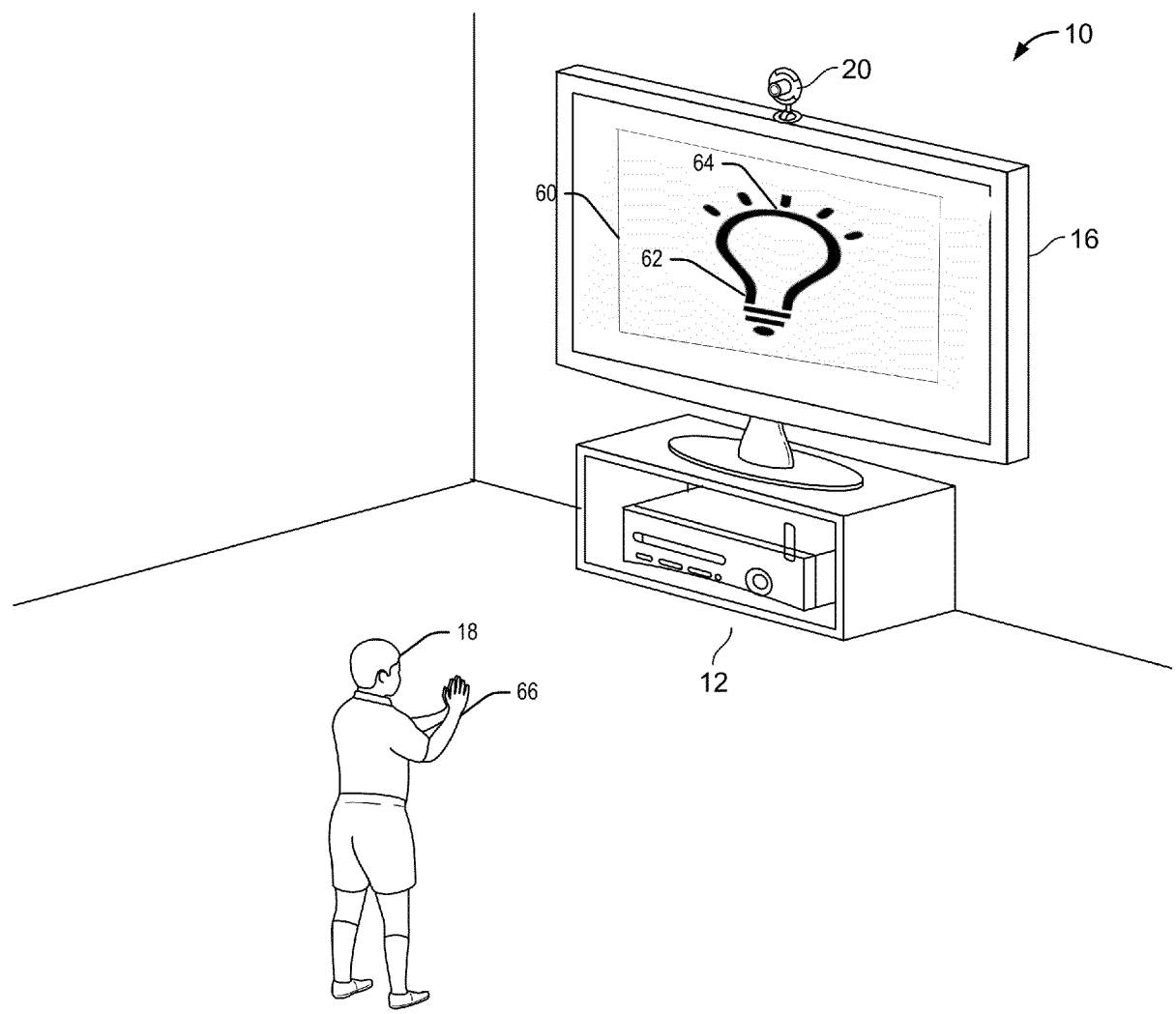

FIG. 13 illustrates a user 18 interacting with another scene of application 202 via a user interface in the computing device 12. In the exemplary illustration shown in FIG. 13, the user 18 interacts with an in-animate object such as a light bulb object 62 depicted in a particular scene 60 of application 202. A result of the user interaction with the light bulb object 62 is illustrated in FIG. 14, in which a user's clap motion 66 is translated into a visual response of the light bulb object 62. As illustrated, the visual response turns the light bulb 62 on, as indicated by the reference numeral, 64.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A method for translating user motion into one or more object responses, based on user interaction with an application executing on a computing device, comprising:
    displaying a non-interactive scene on a display under control of a computing device being controlled by an executing application, the non-interactive scene including an on-screen object;
    receiving user motion data for one or more users from a sensor;
    determining if the user motion data matches one or more predefined gestures;
    if the user motion data matches one or more predefined gestures, automatically translating the user motion data into one or more object responses controlling how the on-screen object moves but not altering an outcome position of the on-screen object in the non-interactive scene,
    the on-screen object corresponding to an object other than an on-screen representation of a user, and the automatically translating the user motion data into one or more object responses controlling how the on-screen object moves but not altering the outcome position of the on-screen object in the non-interactive scene further comprises:
        responsive to determining the user motion data matches one or more predefined gestures, accessing one or more object responses of the on-screen object corresponding to the one or more predefined gestures by accessing a data structure correlating the one or more predefined gestures to the one or more object responses, and
        implementing the one or more object responses, the implementing comprising mapping a model representation of the user into an object model representation of the on-screen object; and
        simultaneously displaying the one or more object responses of the on-screen object based on the translating.

2. The method of claim 1, wherein:
    at least one of the one or more object responses includes an audio response of the on-screen object and a visual response of the on-screen object.

3. The method of claim 1, wherein:
    automatically translating the user motion data into one or more object responses controlling how the on-screen object moves is based on at least one of a velocity or an acceleration determined from the user motion data.

4. The method of claim 1, wherein receiving the user motion data from one or more users further comprises:
    receiving a first user motion data from a first user and second user motion data from a second user.

5. The method of claim 4 further comprising:
    automatically translating the first user motion data into a first object response of the on-screen object;
    automatically translating the second user motion data into a second object response of the on-screen object; and
    simultaneously displaying the first object response and the second object response of the on-screen object to the first user and the second user.

6. The method of claim 5, wherein:

the second object response is different from the first object response when the second user motion data is different from the first user motion data.

7. The method of claim 5, wherein:
the second object response is an amplification of the first object response, when the second user motion data is identical to the first user motion data.

8. The method of claim 1, wherein:
the model representation of the user is a skeletal model representation of the user.

9. The method of claim 1, further comprising:
in response to receiving the user motion data, displaying an animation of an object performing the user motion in addition to displaying the one or more object responses of the on-screen object.

10. The method of claim 1, wherein:
the on-screen object comprises an in-animate object.

11. An apparatus for triggering object response based on user interaction of an application, comprising:
a sensor operable to capture user motion data;
one or more computing devices operable to be controlled by an application during execution of the application and being communicatively connected to the sensor to receive user motion data for one or more users;
a display operable to be controlled by the one or more computing devices for displaying a non-interactive scene, the non-interactive scene including an on-screen object, the on-screen object corresponding to an object other than an on-screen representation of a user;
the one or more computing devices operable to determine if the user motion data matches one or more predefined gestures and if the user motion data matches one or more predefined gestures, the one or more computing devices operable to automatically translate the user motion data into one or more object responses for controlling how the on-screen object moves but not for altering an outcome position of the on-screen object in the non-interactive scene,
the one or more computing devices operable to automatically translate the user motion data into one or more object responses for controlling how the on-screen object moves but not for altering the outcome position of the on-screen object in the non-interactive scene further comprises:
responsive to determining the user motion data matches one or more predefined gestures, the one or more computing devices are operable to access one or more object responses of the on-screen object corresponding to the one or more predefined gestures through access to a data structure correlating the one or more predefined gestures to the one or more object responses, and
the one or more computing devices are operable to implement the one or more object responses, the one or more computing devices are operable to implement the one or more object responses further comprises the one or more computing devices are operable to map a model representation of the user into an object model representation of the on-screen object; and
the one or more computing devices being operable to control the display to display the one or more object responses of the on-screen object based at least in part on the translating.

12. One or more processor readable storage devices having processor readable code embodied on the one or more processor readable storage devices, the processor readable code for programming one or more processors to perform a method comprising:
displaying a non-interactive scene on a display under control of a computing device being controlled by an executing application, the non-interactive scene including an on-screen object;
receiving user motion data for one or more users from a sensor;
determining if the user motion data matches one or more predefined gestures;
if the user motion data matches one or more predefined gestures, automatically translating the user motion data into one or more object responses controlling how the on-screen object moves but not altering an outcome position of the on-screen object in the non-interactive scene,
the on-screen object corresponding to an object other than an on-screen representation of a user, and the automatically translating the user motion data into one or more object responses controlling how the on-screen object moves but not altering the outcome position of the on-screen object in the non-interactive scene further comprises:
responsive to determining the user motion data matches one or more predefined gestures, accessing one or more object responses of the on-screen object corresponding to the one or more predefined gestures by accessing a data structure correlating the one or more predefined gestures to the one or more object responses, and
implementing the one or more object responses, the implementing comprising mapping a model representation of the user into an object model representation of the on-screen object; and
simultaneously displaying the one or more object responses of the on-screen object based on the translating.

13. The one or more processor readable storage devices of claim 12 wherein receiving user motion data for one or more users from a sensor further comprises:
receiving first user motion data for a first user from one or more sensors, the first user motion data corresponding to a first user interaction with the on-screen object;
receiving a second user motion data for a second user from the sensor, the second user motion data corresponding to a second user interaction with the on-screen object;
wherein automatically translating the user motion data into one or more objects controlling how the on-screen object moves further comprises translating the first user motion data into a first motion response of the on-screen object and translating the second user motion data into a second motion response of the on-screen object; and
wherein simultaneously displaying the one or more object responses of the on-screen object based on the automatically translating further comprises simultaneously displaying the first motion response and the second motion response to the first user and the second user.

14. One or more processor readable storage devices of claim 13, wherein:
the second motion response is different from the first object response when the second user motion data is different from the first user motion data.

15. One or more processor readable storage devices of claim 13, wherein:

the second motion response is an amplification of the first motion response, when the second user motion data is identical to the first user motion data.

16. One or more processor readable storage devices of claim 13, wherein:
the sensor includes a depth camera; and
the first user motion data and the second user motion data include depth information from the depth camera.

* * * * *